Figure 1:
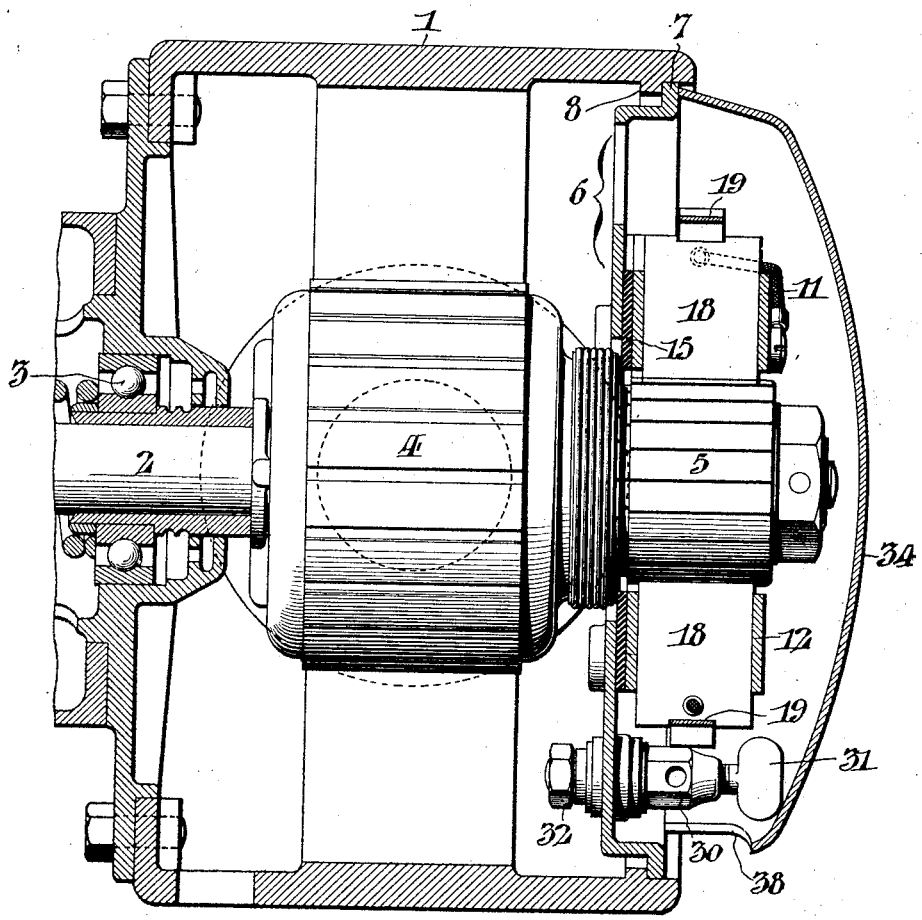

Mar. 6, 1923.

L. A. DARLING 1,447,282

GENERATOR

Filed Apr. 30, 1919

2 sheets-sheet 1

Mar. 6, 1923. 1,447,282
L. A. DARLING
GENERATOR
Filed Apr. 30, 1919 2 sheets-sheet 2
FIG. II
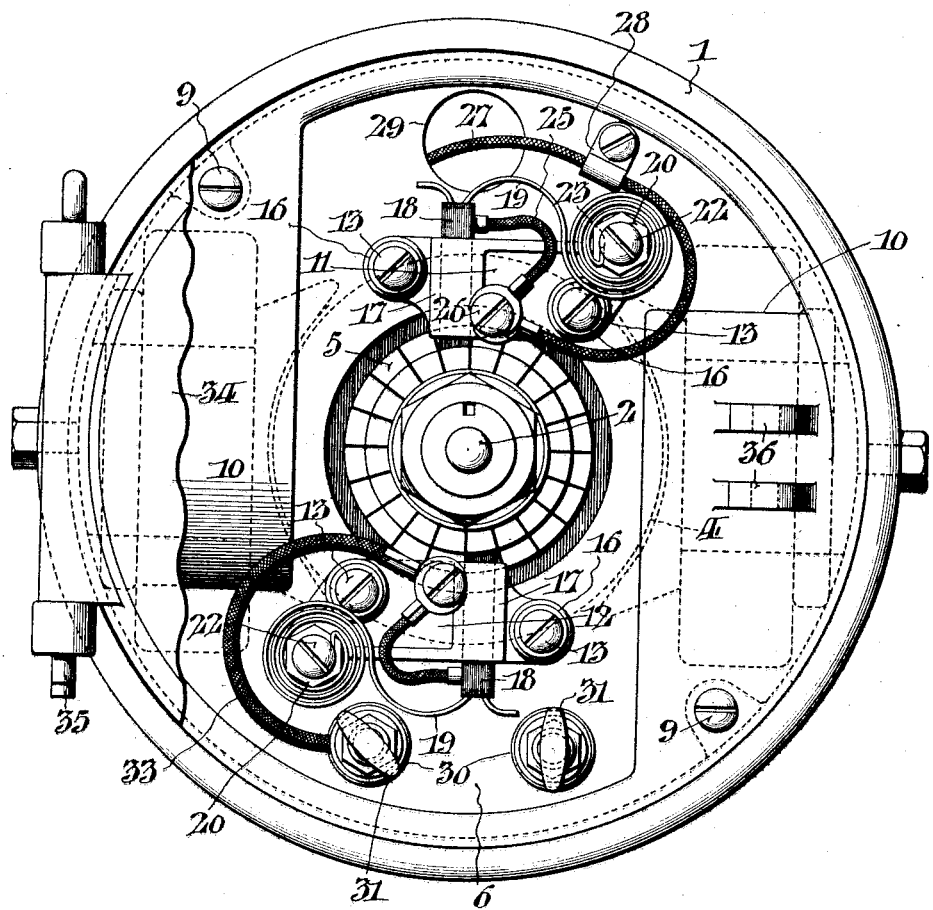
FIG. III
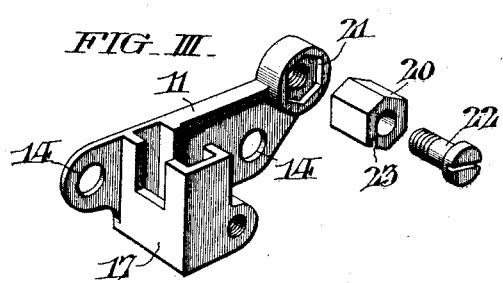
Inventor
Lewis A. Darling, Patented Mar. 6, 1923.

1,447,282

UNITED STATES PATENT OFFICE.

LEWIS A. DARLING, OF PHILADELPHIA, PENNSYLVANIA, ASSIGNOR TO ELECTRIC SERVICE SUPPLIES COMPANY, OF PHILADELPHIA, PENNSYLVANIA, A CORPORATION OF PENNSYLVANIA.

GENERATOR.

Application filed April 30, 1919. Serial No. 293,764.

*To all whom it may concern:*

Be it known that I, LEWIS A. DARLING, a citizen of the United States, residing in the city and county of Philadelphia, and State of Pennsylvania, have invented certain new and useful Improvements in Generators, whereof the following is a specification, reference being had to the accompanying drawings.

My invention relates to generators for turbo-generator units such as are used on locomotives to furnish current to the headlight, and more particularly to the structure and parts of motors and generators which are associated with their commutators and terminals, including brush holder mounting and construction. It is my aim to render the parts mentioned readily and conveniently accessible, adjustable, or removable for any purpose, as well as to provide for their enclosure and protection while in operation. I also aim to secure ruggedness, durability, simplicity of construction, and ease and cheapness of manufacture. How all the foregoing and other advantages can be realized in connection with my invention will appear from the description hereinafter of the best form of embodiment at present known to me, while its scope and essentials will be indicated in my claims.

The invention is especially advantageous under the severe operating conditions of power generator sets for supplying electric current to steam locomotive headlights, both in respect of the vibration and swaying of the locomotive, and by reason of their being (usually) mounted on top of the locomotive boiler, exposed to sulphurous gases and to cinder-laden smoke. Most of the features mentioned above are, it will be seen, of special importance in such sets, in view of the heat and general inconvenience under which repair operations on them must often be carried out.

In the drawings, Fig. I. shows a longitudinal section through a generator constructed in accordance with my invention, and especially adapted for a locomotive headlight steam turbo-generator set.

Fig. II. is an end view of the generator with the parts associated with the commutator exposed by the breaking away of an outer cover.

Fig. III. is a perspective view of certain parts of a brush holder of my invention.

As shown in Fig. I, the generator frame or casing 1, is attached at one end to the frame or casing of the steam turbine whereby it is driven, and the main shaft 2, of the generator set extends into the generator casing through a journal bearing 3, of ball type. On the shaft 2, is mounted the armature proper 4, with its commutator 5, at its right hand end, and across the commutator end of the casing at the inner end of the commutator is a supporting structure 6, having the form of an irregularly pan-like diaphragm plate with a peripheral flange 7, seated in the outer end of the casing 1, against its internal flange 8, and detachably secured (see Fig. II) by means of a couple of screws 9, that take into lugs on the casing 1. This diaphragm 6, has outward extending recess portions 10, that accommodate the poles and field coils of the generator. As shown, the shaft 2, has no outboard bearing, so that the commutator is overhung with respect to the bearing 3, which is thus the outermost bearing at this end of the shaft.

On the outer side of the diaphragm 6, are insulatively mounted and carried the brush holders 11, 12, each firmly and rigidly secured to the diaphragm by two screws 13, 13, extending through holes 14, 14, in the main brush-holder members. As shown, each brush holder 11, is insulated from the diaphragm 6, by means of an interposed plate 15, of insulating fibre of the same shape as the brush holder, and by insulating sleeves in the holes 14, and insulating washers 16, under the heads of the screws 13. These brush holders 11, 12, being just alike, the description of the brush holder 11, will suffice.

The main member of the brush holder 11, (see Fig. III) has guiding means 17, for the longitudinally sliding rectangular carbon brush 18, and the brush 18, is urged endwise against the commutator 5, by a coiled flat spring 19, that acts cantilever-wise on the outer end of the brush. At the center of the spring 19, is a polygonal holding part 20. The main holder member 11, and the part 20, have correlative anti-turning engagement means here shown as consisting of the hexagonally polygonal end of the part 20, and a corresponding polygonal socket 21, in said main holder member, and the part 20, is secured to the main holder member by a screw 22, with its ends engaged in the socket 21. The inside or fixed end of the spring 19, being engaged in a notch 23, in the part 20, the tension of the spring and its pressure on the brush 18, can be adjusted by merely backing out the screw 22, sufficiently to permit the engagement means at 21, to be released so that the part 20 may be turned 60° or a multiple angle. The brush 18, it will be seen, is positively connected to the main brush holder member 11, by a flexible lead 25, on the brush and a binding screw 26, taking into the member 11. The flexible field lead 27, of the brush 18, is also fastened to the binding screw 26, being held in proper position by a screw-fastened clip 28, and penetrating the diaphragm 6, through the ventilating opening 29, near its upper edge.

Near the lower edge of the diaphragm 6, are mounted on the outer side thereof the main generator terminals 30, with their binding means 31,—these terminals 30, having connecting means 32, at the inner side of the diaphragm. The brush holder 12, is connected to one of these terminals by the flexible lead 33.

It will be seen that the diaphragm form of the supporting structure 6, substantially closes off or occludes this end of the motor casing and effectually prevents entrance of large cinders into the generator. Provision for enclosing and protecting the parts on the outer side of the diaphragm 6, is made by means of a cover 34, that practically closes this whole end of the generator casing 1; this cover 34, is pivotally mounted on the casing 1, at 35, independently of the diaphragm 6, so as to be readily swung open to a position where it will expose said parts and not interfere with removal of said diaphragm. It is normally held closed through the instrumentality of engagement means 36, on the diaphragm. Thus the brushes 18, and terminals 30, are readily accessible on the outer side of the structure 6, the moment the door-like cover 34, is opened, and are freely removable along with the readily removable structure 6, upon the detachment of the latter from the casing 1,—the current leads being, of course, detached, as usual, if the brushes, etc., are to be removed altogether, and being made of just sufficient length to permit said structure to be lowered out of the way without detachment of any of them, if only access to the armature or the fields, etc., be desired. This cover 34, affords the parts inside it good protection, since its principal opening is that at is bottom at 38, which permits ventilation and accommodates the main generator leads from the terminals 30.

To facilitate removal and replacement of the diaphragm 6, with the brushes 18, etc., it is advisable to disengage the tension springs 19, from the outer ends of the brushes by lateral flexure (without detachment), after which the free spring ends may rest on the edges of the guide means 17, 17, where they will press laterally against the brushes just sufficiently to keep the brushes from slipping inward in the guide means.

Certain features of the construction herein shown, involving the mounting of the armature 4 on its shaft 2, and its relation to the diaphragm 6 and the commutator 5, are not here claimed, for the reason that they form the subject matter of my application Serial No. 293,763, filed concurrently with this application.

Having thus described my invention, I claim:

1. In a turbo-generator, an open-ended generator casing, a shaft having an unsupported end extending into the casing toward the open end, an armature and commutator carried by the shaft so as to locate the commutator for ready access through said casing opening, a diaphragm removably fitted within the casing opening and having a central opening through which the commutator extends in closely spaced relation to the edges of the diaphragm opening, brushes mounted on the diaphragm, and a door carried by the casing to close the end of the latter, whereby the diaphragm may be readily removed carrying the brushes therewith to expose the armature.

2. In a turbo-generator, an open ended generator casing, a shaft having an unsupported end extending into the casing toward the open end, an armature and commutator carried by the shaft so as to locate the commutator for ready access through said casing opening, an annular shoulder formed around the inner wall of the casing, a diaphragm seated against the shoulder and having a central opening through which the commutator extends in closely spaced relation, brushes mounted on the outer face of the diaphragm, and a door hingedly carried by the casing entering the end thereof to form a closure and seating against the edge of the diaphragm.

In witness whereof, I have hereunto signed my name at Philadelphia, Pennsylvania, this 25th day of April 1919.

LEWIS A. DARLING.

Witnesses:
JAMES H. BELL,
E. L. FULLERTON.